(12) United States Patent
Jüstel et al.

(10) Patent No.: US 6,833,160 B2
(45) Date of Patent: Dec. 21, 2004

(54) METHOD OF COATING A LUMINESCENT MATERIAL

(75) Inventors: Thomas Jüstel, Aachen (DE); Jacqueline Merikhi, Aachen (DE); Hans Nikol, Aachen (DE); Cornelis R. Ronda, Aachen (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 173 days.

(21) Appl. No.: 10/143,436

(22) Filed: May 10, 2002

(65) Prior Publication Data

US 2002/0127329 A1 Sep. 12, 2002

Related U.S. Application Data

(63) Continuation of application No. 09/383,291, filed on Aug. 25, 1999, now Pat. No. 6,472,811.

(30) Foreign Application Priority Data

Aug. 25, 1998 (EP) ............................................. 98202848

(51) Int. Cl.⁷ .............................. B05D 5/06; B05D 5/12; B05D 7/24; B05D 3/02
(52) U.S. Cl. ....................... 427/215; 427/71; 427/212; 428/404
(58) Field of Search .................................. 427/212, 213, 427/214, 215, 216, 217, 218, 219, 64, 65, 66, 67, 68, 69, 71, 73; 313/483–512; 428/403, 404, 405

(56) References Cited

U.S. PATENT DOCUMENTS

| 3,599,028 | A | | 8/1971 | Wanmaker et al. ......... 313/486 |
| 3,968,074 | A | * | 7/1976 | Schwarze et al. ........... 524/381 |
| 4,522,958 | A | * | 6/1985 | Das et al. .................... 523/212 |
| 5,382,452 | A | * | 1/1995 | Bruno et al. ................. 427/215 |
| 5,604,396 | A | | 2/1997 | Watanabe et al. ........... 313/485 |
| 5,811,154 | A | | 9/1998 | Ronda et al. ................. 427/64 |

FOREIGN PATENT DOCUMENTS

| EP | 0160856 A2 | 11/1985 |
| EP | 0476207 A2 | 3/1992 |

* cited by examiner

*Primary Examiner*—Michael Cleveland
(74) *Attorney, Agent, or Firm*—Dicran Halajian

(57) ABSTRACT

A metal M is chosen from the group formed by yttrium, aluminum and lanthanum, and a watery solution of a complex of M and an organic chelating agent is added to a suspension of luminescent material, which causes a layer of $M_2O_3$ to be deposited on the luminescent material, which is them separated, dried and fired.

5 Claims, No Drawings

METHOD OF COATING A LUMINESCENT MATERIAL

CROSS REFERENCE TO RELATED APPLICATIONS

This is a continuation of application Ser. No. 09/383,291, filed Aug. 25, 1999 now U.S. Pat. No. 6,472,811.

BACKGROUND OF THE INVENTION

The invention relates to a method of coating a luminescent material with a layer of a metal oxide $M_2O_3$ in which a metal M is chosen from the group formed by Y, Al and La, in which a compound of M is deposited on the luminescent material by means of homogeneous precipitation from a watery solution.

The invention also relates to a luminescent material obtainable by such a method and to a discharge lamp equipped with a luminescent screen comprising such a luminescent material.

A method as mentioned in the opening paragraph is known from WO 96/05265. Coated luminescent materials show a relatively high stability in the watery slurry that is used in the lamp manufacturing process and an improved maintenance of the light output. A drawback of the known process is that many luminescent materials (for instance materials having a silicate host lattice) are sensitive towards hydrolysis at the relatively low pH values at which the homogeneous precipitation is taking place. Additionally it has been found that the optical properties such as reflectivity and quantum efficiency of other luminescent materials that do not hydrolize in water are adversely effected by a low pH value.

SUMMARY OF THE INVENTION

The invention has for its object to provide a method of coating a luminescent material with a metal oxide by means of homogeneous precipitation from a watery solution in which hydrolysis of the luminescent material and degradation of its optical properties are to a large extent prevented.

According to the invention, a method as described in the opening paragraph is for this purpose characterized in that, in that order, a watery suspension of the luminescent material is prepared, a watery solution containing a complex of M and an organic chelating agent is added to the watery suspension, the luminescent material is separated from the watery suspension and is dried and heated.

It has been found that the organic chelating agent prevents the precipitation of M(OH)3. As a result the homogeneous precipitation can take place at a relatively high value of the pH. Accordingly hydrolysis and degradation of the luminescent material are strongly suppressed.

Good results have been obtained with ethylenediamine, trispyrazolylborate, diglyme, benzoic acid, crown ethers, polyphosphates and triazacyclononane as the organic chelating agent. More in particular good results have been obtained with ethylenediamine tetraacetate.

Good results have also been obtained in case the pH of the watery suspension is in the range 8–10 and the pH of the watery solution is in the range 6.5–7.5.

Luminescent materials obtained by means of a method according to the invention typically have a fine grainy coating consisting of a thin layer of spherical $M_2O_3$ nanoparticles with a diameter smaller than 30 nm. The coating can be distinguished from coatings that were applied by means of chemical vapor deposition (CVD) by means of scanning electron microscope (SEM) or transmission electron microscope (TEM) analysis. The coating properties can also be reflected in macroscopic phosphor features such as slightly enhanced light output due to cleaner surface with a higher scattering compared to coatings applied by means of CVD.

A method according to the invention is particularly suitable for coating luminescent materials having a silicate host lattice, since these luminescent materials hydrolize very easily in a watery solution having a relatively low pH. More in particular the method has proven to be very suitable for the coating with $La_2O_3$ of $BaSi_2O_5$ activated with lead, $(Ba, Sr)_2MgSi_2O_7$ activated with lead and $Zn_2SiO_4$ activated with manganese.

Luminescent materials coated by means of a method according to the invention were found to be very suitable for use in the luminescent screen of a discharge lamp, more in particular a low pressure mercury discharge lamp.

DETAILED DESCRIPTION OF THE PREFERRED EMBODIMENTS

In the first embodiment $BaSi_2O_5$ activated with lead (BSP) is coated with $La_2O_3$. To a solution of 250 mg $La_2O_3$ dissolved in 50 ml demineralized water 125 mg of ethylenediamine tetraacetate (EDTA) is added. The pH value of that solution is adjusted to approximately 7 by adding $Ba(OH)_2$.

To another 50 ml of demineralized water Ba(OH)2 is added until the pH is approximately 9.5. After that, 10 gram of BSP is added to that solution. The LA(EDTA) solution is added dropwise to the BSP suspension. After adding all of the LA(EDTA) solution to the BSP suspension the pH of the suspension is once more adjusted to approximately 9.5 by adding $Ba(OH)_2$. The suspension is then stirred for two hours and the coated BSP is subsequently separated by filtration. Finally, the phosphor is washed with alkaline water, dried at 80 C. and fired 900 C. for two hours. The emission spectrum of coated BSP was substantially identical to that of uncoated BSP ($\lambda$max=350 nm; FVMM=38 nm). Also the reflection coefficients for 254 nm and 350 nm radiation were almost identical (20% and 96% for uncoated BSP and 19% and 95% for coated BSP respectively). Surprisingly, however, the quantum efficiency for 254 nm radiation of the coated BSP was found to be 6% higher than that of uncoated BSP (94% and 88% respectively).

In a second embodiment (Ba, Sr)2M9Si2O7 activated with lead (SMS) is coated with $La_2O_3$. The coating process used is identical to the process described hereabove for the coating of BSP, except that $Sr(OH)_2$ was used instead of $Ba(OH)_2$. The emission spectra of coated and uncoated SMS are substantially identical ($\lambda$max=360 nm; FVMM=60 nm). The quantum efficiency for 254 nm radiation of coated and uncoated SMS was found to be 75%. The reflection coefficients for 254 nm and 350 nm radiation were 8% and 96% for uncoating SMS and 10% and 95% for coated SMS respectively.

In a third embodiment $Zn_2SiO_4$ activated with manganese (ZSM) is coated $La_2O_3$. The coating process used is identical to the process described hereabove for the coating of BSP, except that NaOH was used instead of $Ba(OH)_2$. The emission spectra of coated and uncoated ZSM are substantially identical ($\lambda$max=52Onm; FVMM=41 nm). The quantum efficiency of coated and uncoated ZSM was found to be 79% and 80% respectively. The reflection coefficients for 254 nm radiation were 94% and 93% for uncoated ZS coated ZSM respectively.

What is claimed is:

1. A method of coating a luminescent material with a layer of a metal oxide $M_2O_3$ in which a metal M is chosen from the group formed by Y, Al and La, in which a compound of M is deposited on the luminescent material by means of homogeneous precipitation, said method comprising preparing a watery suspension of the luminescent material, adding a watery solution containing a complex of M and an organic chelating agent to the watery suspension, separating the luminescent material from the watery suspension and drying and heating the luminescent material, wherein said drying and heating forms a layer over said luminescent material, said layer comprising granular, spherical nanoparticles of the metal oxide, said nanoparticles having a diameter smaller than 30 nm, said layer being substantially free of $M(OH)_3$.

2. A method according to claim 1, wherein the organic chelating agent is ethylenediamine, trispyrazolylborate, diglyme, benzoic acid, crown ethers, polyphosphates and triazacyclononane or ethylenediamine tetraacetate.

3. A method as claimed in claim 2, wherein the organic chelating agent is ethylenediamine tetraacetate.

4. A method as claimed in claim 1 wherein the pH of the watery suspension is in the range 8–10.

5. A method as claimed in claim 1, wherein the pH of the watery solution is in the range 6.5–7.5.

* * * * *